(12) United States Patent
Dannecker et al.

(10) Patent No.: US 9,672,304 B2
(45) Date of Patent: Jun. 6, 2017

(54) DYNAMIC ONLINE ENERGY FORECASTING

(71) Applicants: Lars Dannecker, Dresden (DE); Philipp Roesch, Dresden (DE)

(72) Inventors: Lars Dannecker, Dresden (DE); Philipp Roesch, Dresden (DE)

(73) Assignee: SAP SE, Walldorf (DE)

( * ) Notice: Subject to any disclaimer, the term of this patent is extended or adjusted under 35 U.S.C. 154(b) by 631 days.

(21) Appl. No.: 14/170,382

(22) Filed: Jan. 31, 2014

(65) Prior Publication Data
US 2015/0120223 A1 Apr. 30, 2015

Related U.S. Application Data

(60) Provisional application No. 61/895,346, filed on Oct. 24, 2013, provisional application No. 61/895,347, filed on Oct. 24, 2013.

(51) Int. Cl.
*G01R 21/00* (2006.01)
*G06F 17/50* (2006.01)
*G06Q 50/06* (2012.01)

(52) U.S. Cl.
CPC ........ *G06F 17/5009* (2013.01); *G06Q 50/06* (2013.01); *G06F 2217/78* (2013.01); *Y02E 60/76* (2013.01); *Y04S 10/60* (2013.01); *Y04S 40/22* (2013.01)

(58) Field of Classification Search
CPC .......... Y04S 10/60; Y04S 40/22; Y02E 60/76; G06F 2217/78; G06F 17/5009; G06Q 50/06; G01R 21/133
See application file for complete search history.

(56) References Cited

U.S. PATENT DOCUMENTS

| | | | | |
|---|---|---|---|---|
| 9,229,132 B2* | 1/2016 | Guha | | G01W 1/10 |
| 9,361,273 B2* | 6/2016 | Dannecker | | G06F 17/18 |
| 2013/0325347 A1* | 12/2013 | Giorgetti | | G01W 1/10 |
| | | | | 702/3 |

OTHER PUBLICATIONS

A. Zellner and J. Tobias, "A Note on Aggregation, Disaggregation and Forecasting Performance," *Journal of Forecasting*, 19:457-469 (2000).
B. Gnauk, L. Dannecker, and M. Hahmann, "Leveraging Gamification in Demand Dispatch Systems," *Proceedings of the 1st EnDM workshop (EDBT 2012)*, pp. 103-110 (2012).

(Continued)

*Primary Examiner* — Elias Desta
(74) *Attorney, Agent, or Firm* — Klarquist Sparkman, LLP

(57) ABSTRACT

Examples of dynamic online energy forecasting are provided herein. An energy forecast request is received. An initial energy forecast is calculated in response to the request. One or more of a plurality of energy forecast model instances are selected as candidate forecast model instances. At least one of the candidate instances are transformed into an improved forecast model instance having greater accuracy than the candidate forecast model instance. The transformation is accomplished by determining alternative values for at least some parameters of an energy forecast model of the candidate forecast model instance. An improved energy forecast having a greater accuracy than the initial forecast can then be calculated using the improved forecast model instance.

20 Claims, 8 Drawing Sheets

(56) References Cited

OTHER PUBLICATIONS

D. Agrawal, D. Chen, L. ji Lin, J. Shanmugasundaram, and E. Vee, "Forecasting high-dimensional data," *SIGMOD*, pp. 1003-1012 (2010).

D. Liu and J. Nocedal, "On the Limited Memory BFGS Method for Large Scale Optimization," *Mathematical Programming 45*, 45(3):503-528 (1989).

D. M. Dunn, W. H. Williams, and T. L. DeChaine, "Aggregate Versus Subaggregate Models in Local Area Forecasting" *Journal of the American Statistical Association*, 71:68-71 (1976).

Directorate-General for Research, "Smart grids: vision and strategy for Europe's electricity networks of the future," Report, European Commission (2006).

ENTSO-E—European Network of Transmission System Operators for Electricity. *The Harmonised Electricity Market Role Model* (2011).

ENTSO-E. *Scenario Outlook and System Adequacy Forecast 2011-2025* (2011).

G. Fliedner, "Hierarchical forecasting: issues and use guidelines," *Industrial Management & Data Systems*, 101:5-12 (2001).

General Secretariat of the Council. European Council Feb. 4, 2011: Conclusions. Governmental publication, European Commission (2011).

H. Berthold, M. Boehm, L. Dannecker, F.-J. Rumph, T. B. Pedersen, C. Nychtis, H. Frey, Z. Marinsek, B. Filipic, and S. Tselepis, "Exploiting renewables by request-based balancing of energy demand and supply," In *11th IAEE European Conference* (2010).

I. Pineda and P. Wilczek, "Creating the Internal Energy Market in Europe: A Report by the European Wind Energy Association," Industrial analysis and report, EWEA—European Wind Energy Association (2012).

J. A. Nelder and R. Mead, "A simplex method for function minimization," *The Computer Journal*, 7(4):308-313 (1965).

J. Cohen, B. Dolan, M. Dunlap, J. M. Hellerstein, and C. Welton, "Mad skills: New analysis practices for big data," *PVLDB*, 2(2):1481-1492 (2009).

J. G. D. Gooijer and R. J. Hyndman, "25 years of time series forecasting," *International Journal of Forecasting*, 22(3):443-473 (2006).

J. M. Hellerstein, P. J. Haas, and H. J. Wang, "Online aggregation," In Proceedings of the 1997 SIGMOD, pp. 171-182 (1997).

J. W. Taylor, "Triple Seasonal Methods for Short-Term Electricity Demand Forecasting," *European Journal of Operational Research*, 204(1):139-152 (2010).

J. Wilkes, J. Moccia, and M. Dragan, "Wind in power: 2011 European statistics," Industrial analysis and report, EWEA—The European Wind Energy Association (2012).

L. Dannecker, M. Boehm, W. Lehner, and G. Hackenbroich, "Forecasting evolving time series of energy demand and supply," *15th ADBIS*, pp. 302-315 (2011).

L. Dannecker, R. Schulze, M. Boehm, W. Lehner, and G. Hackenbroich, "Context-aware parameter estimation for forecast models in the energy domain," in 23rd SSDBM, pp. 491-508 (2011).

M. Boehm, L. Dannecker, A. Doms, E. Dovgan, B. Filipic, U. Fischer, W. Lehner, T. B. Pedersen, Y. Pitarch, L. Siksnys, and T. Tusar, "Data Management in the MIRABEL Smart Grid System," in *1st EnDM (15th EDBT)* (2012).

M. Cailliau, J. A. Ogando, H. Egeland, R. Ferreira, H. Feuk, F. Figel, S. G. Jensen, J. Karas, C. Kawann, C. M. Villar, J. McManus, S. Naletto, H. Nosei, A. Poullikkas, J. Sundell, R. Vrolijk, B. Walter, and M. Zoglauer, "Integrating Intermittent Renewable Sources into the EU Electricity System by 2020: Challenges and Solutions," Industrial analysis and report, Eurelectric: Electricity for Europe (2011).

MeRegio Project. http://www.meregio.de/en/, accessed Jan. 31, 2014.

MIRABEL Project. http://www.mirabel-project.eu, accessed Jan. 31, 2014.

Nationalgrid UK. *Metered half-hourly electricity demands*, www-01.ibm.com/software/data/soliddb/, accessed Jan. 31, 2014.

P. G. Brown, "Overview of scidb: large scale array storage, processing and analysis," In SIGMOD (2010).

P. Grosse, W. Lehner, T. Weichert, F. Faerber, and W. Li, "Bridging two Worlds with RICE, "In 37th VLDB, pp. 1307-1317 (2011).

P. R. Winters, "Forecasting sales by exponentially weighted moving averages," *Management Science*, pp. 324-342 (1960).

R. H. Byrd, P. Lu, J. Nocedal, and C. Zhu, "A limited memory algorithm for bound constrained optimization, "*SIAM J. Scientific Computing*, 16:1190-1208 (1995).

R. J. Hyndman, A. B. Koehler, R. D. Snyder, and S. Grose, "A state space framework for automatic forecasting using exponential smoothing methods," *International Journal of Forecasting*, 18:439-454 (2002).

R. J. Hyndman, "Another look at forecast-accuracy metrics for intermittent demand," *The International Journal of Applied Forecasting*, (4):43-46 (2006).

R. J. Hyndman, R. A. Ahmed, G. Athanasopoulos, and H. L. Shang, "Optimal combination forecasts for hierarchical time series," *Computational Statistics and Data Analysis*, 55(9):2579-2589 (2008).

R. Ramanathan, R. Engle, C. W. Granger, F. Vahid-Araghi, and C. Brace, "Short-run forecasts of electricity loads and peaks," *Int. Journal of Forecasting*, 13(2):161-174 (1997).

Ren21, "Renewables 2011 global status report," Technical report, Ren21 (2011).

Robert Lorenz, Lars Dannecker, Philipp Rösch, Wolfgang Lehner, Gregor Hackenbroich: Forecasting in Hierarchical Environments; In: Proceedings of the 25th Scientific and Statistical Database Management Conference (SSDBM 2013, Baltimore, ML, USA) (2013).

S. Das, Y. Sismanis, K. S. Beyer, R. Gemulla, P. J. Haas, and J. McPherson, "Ricardo: integrating r and hadoop," *SIGMOD*, pp. 987-998 (2010).

S. Duan and S. Babu, "Processing forecasting queries," In 33th VLDB, pp. 711-722 (2007).

S. Kirkpatrick, C. D. Gelatt, and M. P. Vecchi, "Optimization by Simulated Annealing," *Science*, 220(4598):671-680 (1983).

T. Ge and S. Zdonik, "A skip-list approach for efficiently processing forecasting queries," in 34th VLDB, pp. 984-995 (2008).

T. Jamasb and M. Pollitt, "Electricity market reform in the European union: Review of progress toward liberalization & integration," *The Energy Journal*, 0(Special I):11-42 (2005).

U. Fischer, C. Schildt, C. Hartmann, and W. Lehner, "Forecasting the Data Cube: A Model Configuration Advisor for Multi-Dimensional Data Sets," In *29th ICDE* 853-864 (2013).

U. Fischer, F. Rosenthal, and W. Lehner, "Sample-Based Forecasting Exploiting Hierarchical Time Series," *Proceedings of the 16th IDEAS*, pp. 120-129 (2012).

U. Fischer, M. Böhm, and W. Lehner, "Offline design tuning for hierarchies of forecast models," *14th BTW*, pp. 167-186 (2011).

\* cited by examiner

DYNAMIC ONLINE ENERGY FORECASTING

CROSS-REFERENCE TO RELATED APPLICATIONS

This application claims the benefit of U.S. Provisional Application No. 61/895,346, filed on Oct. 24, 2013 and titled "ONLINE FORECASTING FOR SMART ENERGY ANALYTICS" and U.S. Provisional Application No. 61/895,347, filed on Oct. 24, 2013 and titled "EFFICIENT FORECASTING FOR HIERARCHICAL TIME SERIES," both of which are incorporated herein by reference in their entirety.

BACKGROUND

Energy systems conventionally rely upon forecasting to balance energy production with consumption. New energy market dynamics, emerging smart grid technology, and an increasing utilization of renewable energy sources has resulted in increased demand for quick, accurate energy forecasts to allow real-time balancing of energy production and consumption. Conventional energy forecasts are typically calculated one day ahead at the same time of day and do not require much flexibility. Consequently, conventional forecasting processes are rather static and are not typically designed for use with emerging energy systems.

DETAILED DESCRIPTION

Figure 1:
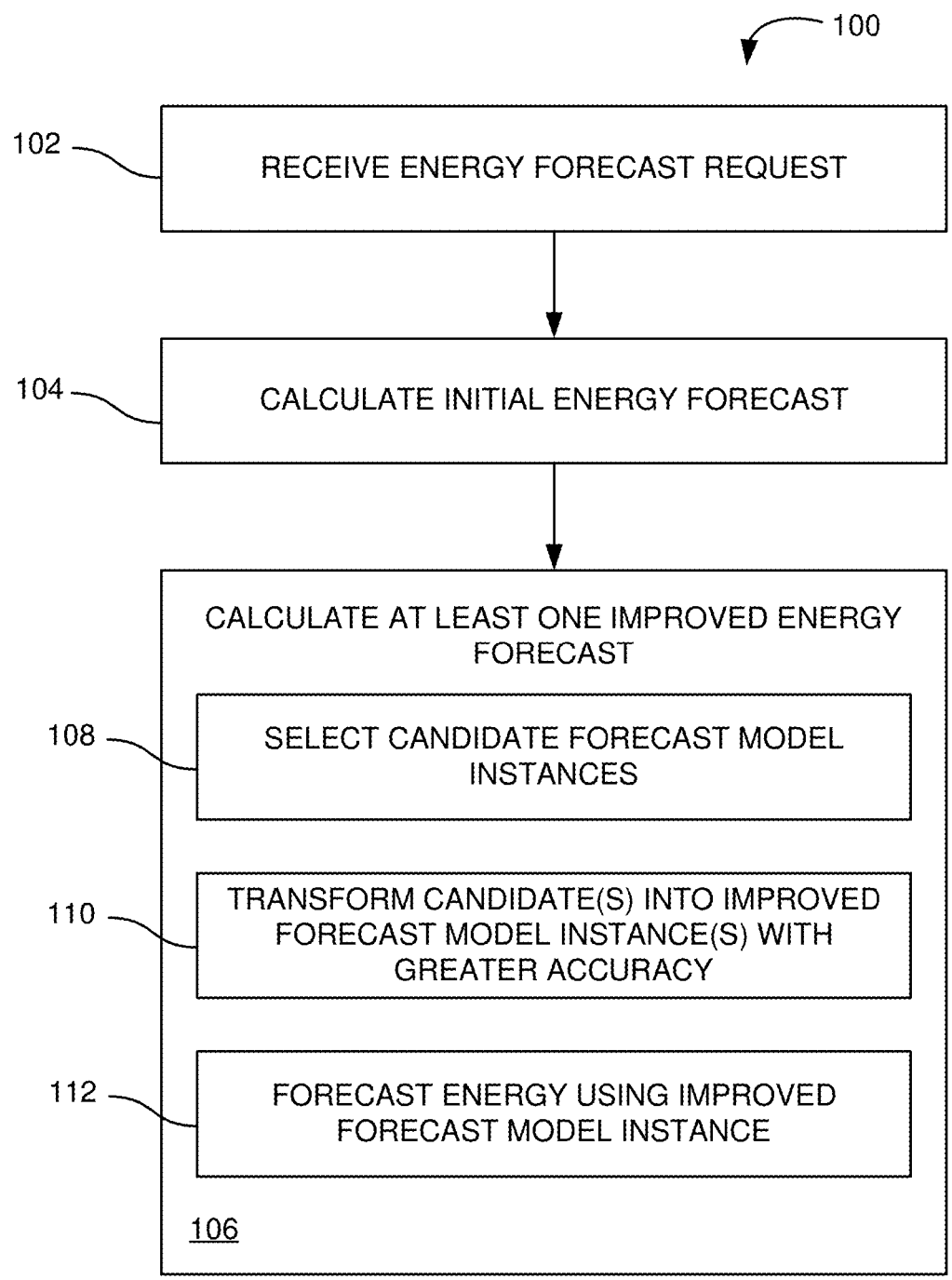
FIG. 1 illustrates an example method of dynamically forecasting energy.

The examples described herein generally dynamically produce energy forecasts for energy systems. Accurate forecasts are needed to properly balance energy demand and supply and thus, for the stability of the electricity grids.

Energy forecasting employs mathematical models, referred to as forecast models, that model the behavior and development of historic time series. Example forecast models include autoregressive models such as the multi-equation EGRV model and exponential smoothing models such as Taylor's triple seasonal exponential smoothing model. Forecast models employ a set of parameters, each parameter having a parameter value, to express different characteristics of the time series such as seasonal patterns or trends. For example, the triple exponential smoothing forecast model has the parameters $\alpha$ (alpha), $\beta$ (beta), and $\gamma$ (gamma). For the triple exponential smoothing model, $\alpha$ can be referred to as the "data smoothing factor;" $\beta$ can be referred to as the "trend smoothing factor;" and $\gamma$ can be referred to as the "seasonal change smoothing factor." Each of $\alpha$, $\beta$, and $\gamma$ can have values between 0 and 1. Other forecast models and corresponding parameters are known. A "forecast model instance" refers to a forecast model type (e.g. exponential smoothing) and values for the corresponding parameters. As used herein, "forecast model" may refer to a forecast model type or a forecast model instance. Additionally, although a forecast model type has one or more corresponding forecast model parameters that each can have a value, as used herein, "parameter" may refer to a parameter or a value for the parameter.

To better capture the historic behavior of a time series, the parameters are estimated on a training dataset with the goal of minimizing the forecast error (i.e., the difference between actual and predicted values) that is measured in terms of an error metric. This estimation is typically conducted using local (e.g., LBFGS) or global (e.g., simulated annealing) optimization algorithms and is rather complex, because the parameter search space increases exponentially with the number of parameters. Therefore, the parameter estimation renders the entire forecasting process very expensive, especially when using very accurate but complex energy forecast models. In contrast, emerging markets and technologies demand real-time capabilities for the balancing of energy production and consumption. Research projects and industrial solutions such as MIRABEL (Micro-Request-Based Aggregation, Forecasting and Scheduling of Energy Demand, Supply, and Distribution) and MeRegio deal with the challenge of providing real-time energy balancing by proposing approaches such as demand response systems, flexible energy requests, and real-time energy trading. Such approaches are premised upon the availability of current and accurate forecasts at any point in time. As a result, these new developments require a very efficient calculation and provisioning of forecasts and thus, more efficient forecasting capabilities of the employed energy data management systems (EDM).

Conventional forecast calculation typically consists of two main phases: (1) the forecast calculation and (2) the forecast model maintenance. The forecast calculation starts with identifying the most suitable forecast model. Unfortunately, there is no analytical approach that can ultimately choose the best model solely based on the given data. There exist some advisor techniques such as the (partial) auto correlation function ((P)ACF) that can limit the number of model candidates, but they cannot provide a final choice. Thus, typically it is necessary to empirically evaluate a large number of forecast models, which also requires separately estimating values for their parameters. The parameter estimation is the second step in the forecast process and is very time-consuming, especially with a large number of model candidates. The last step is the calculation of the forecast. With an estimated forecast model, the computation is rather inexpensive.

Conventionally, there are three typical strategies for efficiently computing an accurate forecast. First, a manual approach in which a human expert manually selects the most appropriate forecast models and optimization algorithms. The human expert manually selects suitable parameter values and uses the created forecast model instance to calculate forecasts. From time to time the human expert reevaluates the forecast model. Due to the human involvement, this strategy is typically slow in detecting and reacting on changing time series characteristics and depends on the knowledge of the expert.

A heuristic approach uses heuristic techniques to automatically identify a set of promising forecast models as well as suitable candidates from a set of given forecasting algorithms. The candidate models are estimated first using global optimization algorithms and are afterwards refined using local optimizers. The strategy starts from scratch for each forecasting calculation and therefore typically takes a long time to provide results.

A last model approach begins optimization from the last recently used forecast model and corresponding parameter values. Thus, model identification is avoided and suitable starting points can be provided to the selected optimization algorithm. While this strategy allows a relatively efficient forecasting calculation, it focuses on a single model only. Possible better results from other forecast models are not covered. This strategy also uses a one-time initialization using either the manual or the heuristic strategy.

In the energy domain, new measurements are constantly appended to the time series, which can change the time series behavior. Thus, to obtain accurate results, forecast models must be continuously adapted to these changes. This can be done in the forecast model maintenance portion of the forecasting process, which includes model evaluation and adaptation. First, the forecasting accuracy is evaluated using an error metric such as the Symmetric Mean Absolute Percentage Error (SMAPE). The forecast error can be used as a trigger for the forecast model adaptation, which then adjusts the forecast model instance to the most recent time series developments. This is typically done by using one of the above calculation strategies and thus, the adaptation is almost as expensive as the initial forecasting calculation.

Three common strategies for determining when to adapt the forecast model are on-request adaptation, on-update adaptation, and periodic adaptation. In on-request adaptation, the model can be adapted when receiving a request. This strategy typically requires the least system resources and considers the most recent time series developments but also typically poses the longest query response times. In on update adaptation, the model can be adapted each time a new time series value is added. Using this strategy, the most accurate forecast model instance is typically always available. However, it also typically exhibits high system loads, due to continuous adaptations, which can be an issue when managing a large number of models.

Periodic adaptation involves adapting the model after a given time frame or when violating an error threshold. This strategy usually results in neither high response times, nor high system loads. However, it raises the challenge of finding suitable time frames or error thresholds. Time frames that are too long or thresholds that are too high might result in inaccurate forecast models, while narrow definitions can result in unnecessary model adaptations. Additionally, the value for a suitable error threshold might vary, since the shape complexity of the time series can change over time. A first optimization is to combine time periods and error thresholds. Here, a forecast model can be re-estimated in regular intervals or in between the periods when the forecast error violates a given threshold.

The conventional forecast calculation and maintenance strategies do not meet the needs of recent energy market developments. The strategies for calculating a forecast are either time consuming or pose the risk of starving in a local optimum. Additionally, there is typically no support for the requesting applications to control the progression of the calculation process. Rather, these strategies provide results only when the entire calculation is finished. At the same time, the traditional maintenance strategies either exhibit too long query response times or very high system load. Even the more advanced strategy of using time periods or error thresholds poses the risk of having non-beneficial values for the interval or error threshold, which degenerates also this strategy to be too computationally expensive or to provide inaccurate results.

Novel online forecasting processes are described herein. The online forecasting processes can rapidly provide forecasting results and iteratively refine them over time. Long calculation times can be avoided, and applications can adapt the processes to their needs. The online forecasting processes offer a very efficient and flexible way of providing forecasts to requesting applications.

Examples of Dynamic Online Computation of Accurate Forecasts

Constantly available forecasts and process adaptability to application requirements can be provided by using the novel online forecasting processes described herein that can be implemented as part of an Energy Data Management (EDM) system. The online forecasting processes can use special forecast model materialization in conjunction with a flexible iterative parameter estimation process to rapidly provide accurate forecasts. As part of the materialization, a number of previously employed forecast models, including their parameter combinations, are stored. The materialized model instance that is most suitable for the current time series development is selected and can be subsequently used to quickly provide a first forecast. Afterwards, the selected forecast model instances can be iteratively refined using multiple optimization algorithms. As used herein, "optimization" does not necessarily mean that an optimum or best estimation was reached or attempted. Instead, "optimization" simply refers to "improvement" or a "better" result. The words "optimization" and "improvement" are used interchangeably.

A subscription can be offered to improved forecasts found during the optimization. The materialized forecast models are suitable starting points for re-estimation of parameter values, reducing the time required by the optimization algorithms. Applications can flexibly adapt the online forecasting process to their needs by defining runtime constraints and accuracy targets. Thus, applications requiring results in a limited time frame or targeting a certain accuracy can be equally supported.

When a model adaptation is triggered, the most accurate instances with respect to the current time series behavior can be provided from a repository to the subsequent optimization. Thus, multiple forecast models and starting points can be considered, but their number can be limited by pruning forecast models and values for corresponding parameters that did not provide accurate forecasts in the past. Subsequently, candidate instances can be refined in parallel using iterative, local optimization (also referred to herein as a "local improvement process.") For the maintenance of the online forecasting process, long wait times for delivery of accurate results can be avoided by providing updated, more accurate forecasts as they become available through the iterative, local improvement process.

Starvation in local minima with respect to forecast models and starting points considered in the forecast model repository can also be avoided by adding an asynchronous global coverage process in some examples. The global coverage process can use global optimization algorithms to estimate values for the parameters of the forecast models available in the forecasting system. With that, missing better solutions provided by forecast models not considered in the forecast model repository can be avoided. Suitable parameter values in areas of the search space not covered by the local optimization algorithms of the iterative local improvement process can also be searched for. The model candidates provided by the global coverage process can be added to the repository for consideration in further iterations of the online forecasting process. In some examples, the global coverage process is executed after the optimization, when free resources are available. In other examples, the global coverage process is executed substantially concurrently. In some examples, however, only a local improvement process is performed.

FIG. 1 illustrates a method 100 of dynamically forecasting energy. In process block 102 an energy forecast request is received. In response to receiving the energy forecast request, an initial energy forecast is calculated in process block 104. In some examples, the initial energy forecast is calculated using one of a plurality of forecast model instances stored in a forecast model instance repository. For example, a previously used forecast model instance with the lowest forecast error can be selected. At least some of the plurality of forecast model instances stored in the repository have been previously used to calculate an energy forecast.

In process block 106, at least one improved energy forecast is calculated. The improved energy forecast has a greater accuracy than the initial energy forecast. Accuracy can be determined, for example, based upon the forecast error of the forecast model instance used to calculate a forecast. The improved energy forecast can be calculated in a number of ways. In method 100, the improved forecast calculation comprises process blocks 108, 110, and 112. In process block 108, one or more of a plurality of forecast model instances are selected as candidate forecast model instances. The respective forecast model instances specify an energy forecast model and values for a plurality of energy forecast model parameters for the energy forecast model. In some examples, the candidate forecast model instances are selected from available forecast model instances stored in a forecast model repository.

At least one of the candidate forecast model instances is transformed into an improved forecast model instance having greater accuracy than the candidate forecast model instance in process block 110. The transformation is accomplished by determining alternative values for at least some of the plurality of energy forecast model parameters of the candidate forecast model instance. In some examples, a plurality of candidate forecast model instances are transformed into improved forecast model instances. In some examples, a local improvement process is performed to determine the alternative parameter values. In an example local improvement process, a plurality of local optimization algorithms are applied to the candidate forecast model instances, and at least one of the plurality of local optimization algorithms is used to transform the at least one of the candidate forecast model instances into the improved forecast model instance.

Energy is forecasted in process block 112 using the improved forecast model instance. The resulting energy forecast can then be communicated to the requesting entity or application. In some examples, upon determining that the improved forecast model instance is not already stored in a forecast model repository, the improved forecast model instance is added to the repository. The improved forecast model instance will then be available for use when future energy forecast requests are received.

In some examples, method 100 also comprises upon determining that a forecast error threshold has been reached, ending the method. In this way, the needs of the system or user can dictate when an appropriate trade-off between accuracy and time has been attained. In other examples, method 100 can end after a pre-determined time interval or number of iterations.

In some examples, method 100 comprises performing a global coverage process. In some example global coverage processes, it is determined whether forecast model instances not evaluated in the local improvement process have a greater accuracy than at least one forecast model instance stored in a forecast model repository from which the candidate forecast models are selected. If a forecast model instance evaluated through global coverage is determined to have greater accuracy (e.g., lower forecast error), then the forecast model instance can be added to a forecast model repository so that it will be available when future energy forecast requests are received. The global coverage process can be performed, for example, after or currently with the local improvement process. This is shown in FIG. 2.

Figure 2:
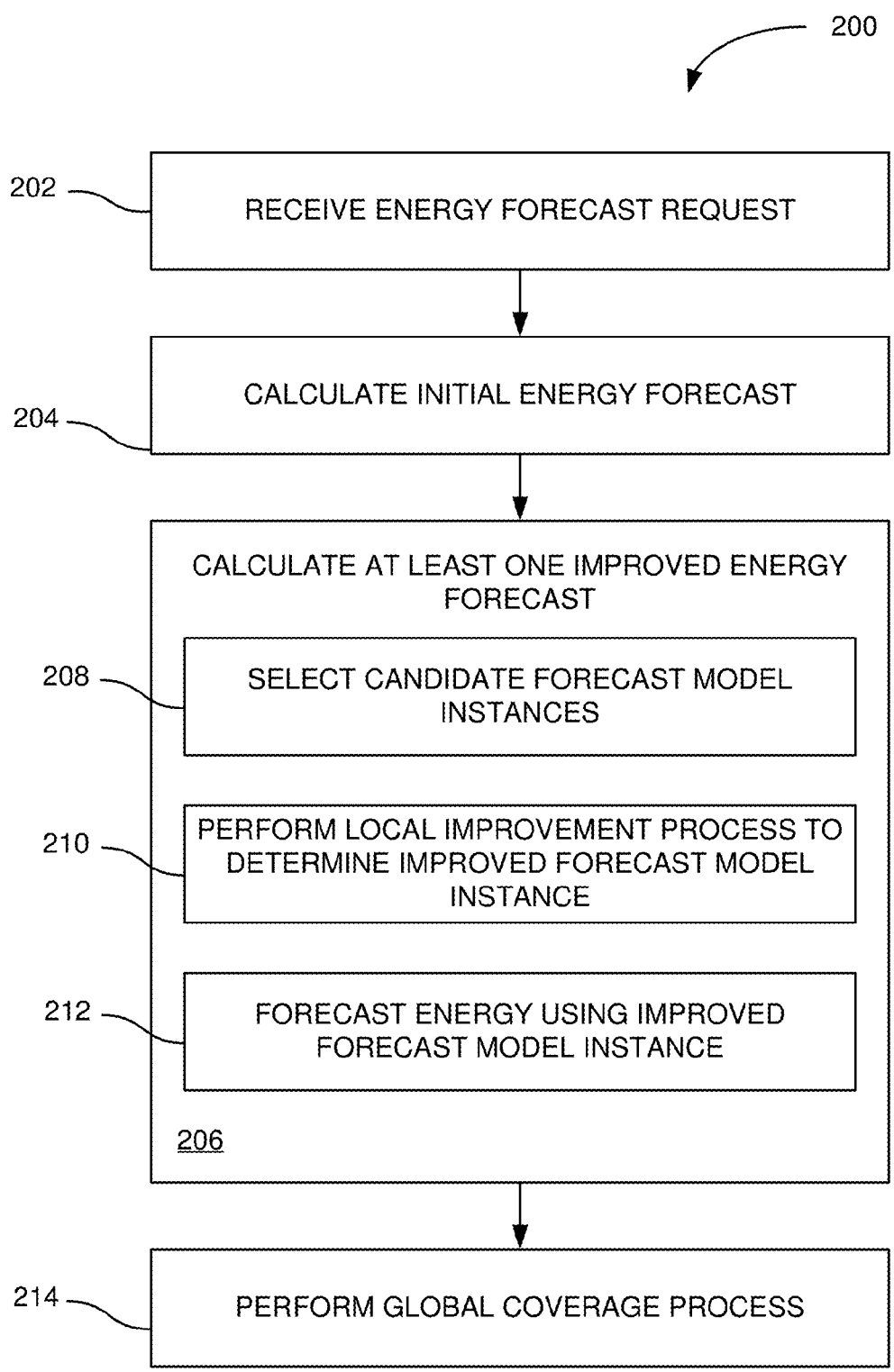
FIG. 2 illustrates an example method of dynamically forecasting energy in which both local improvement and global coverage processes are performed.

FIG. 2 illustrates a method 200 of dynamically forecasting energy. In process block 202, an energy forecast request is received. An initial energy forecast is calculated in process block 204. In some examples, the initial energy forecast is calculated using a forecast model instance stored in a forecast model repository. In process block 206, at least one improved energy forecast is calculated. Process block 206 comprises process blocks 208, 210 and 212. In process block 208, one or more forecast model instances, from a forecast model repository, for example, are selected as candidate forecast model instances. In process block 210, a local improvement process is performed to determine one or more improved forecast model instances based on the candidate forecast model instances. In some examples, the local improvement process includes applying a plurality of local optimization algorithms substantially concurrently to the candidate forecast model instances. In process block 212, energy is forecasted using an improved forecast model instance. A global coverage process is then performed in process block 214.

Figure 3:
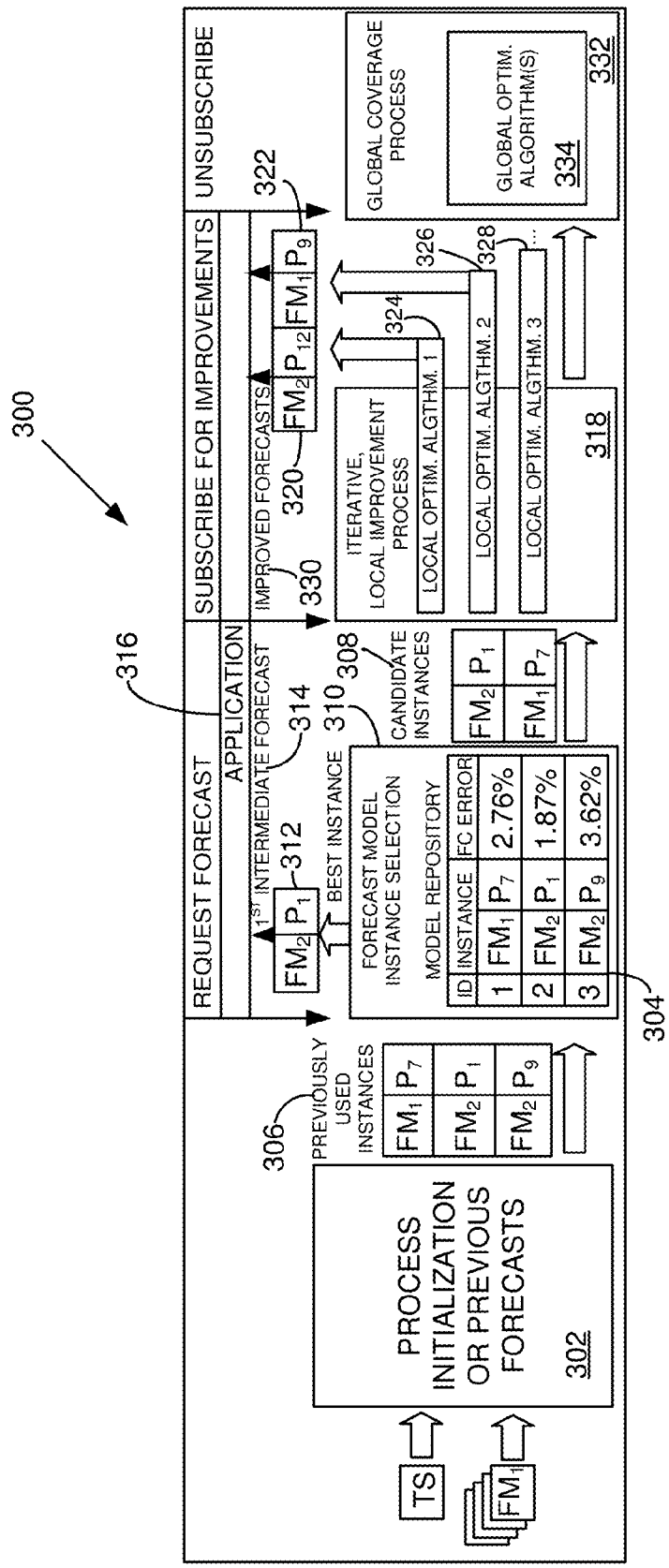
FIG. 3 is a flow chart illustrating an example of dynamic energy forecasting using local improvement and global coverage.

FIG. 3 illustrates an example online forecasting process 300 in detail. Prior to executing the actual online forecasting process, a one-time initialization 302 can be conducted to fill the forecast model repository 304 with an initial set of forecast model instances 306. The initialization is typically performed only once when adding a new time series and can be executed using a heuristic strategy. After initialization, forecast model repository 304 contains previously used forecast model instances (F $M_m$ $P_p$). From this repository, candidate instances 308 can be selected with a case-based reasoning approach in process block 310, and the most accurate instance 312 can be used to quickly calculate a first forecast 314. First forecast 314 can be directly provided to an application 316, which means that application 316 quickly receives a first intermediate result (from experiments in around 1 ms). In some examples, application 316 initiates process 300 by requesting an energy forecast.

Subsequently, candidate model instances 308 can be refined by re-estimating values for their parameters using a flexible local improvement process 318. More accurate forecast model instances 320 and 322 found by applying optimization algorithms 324, 326, and 328 in local improvement process 318 can be used to calculate improved forecasts 330 that can be iteratively provided to application 316. Application 316 can terminate the subscription to forecasting process 300 at any time or define runtime constraints and accuracy targets to influence the progression of the forecasting process. Subsequently, online forecasting process 300 employs a continuous global coverage strategy 332 to search for promising forecast model instances in areas of the search space not covered by local improvement process 318 and considering forecast models currently not included in forecast model repository 304. Global coverage process 332 applies global optimization algorithm(s) 334 to search for the forecast model instances that would not be identified through local improvement process 318.

Figure 4:
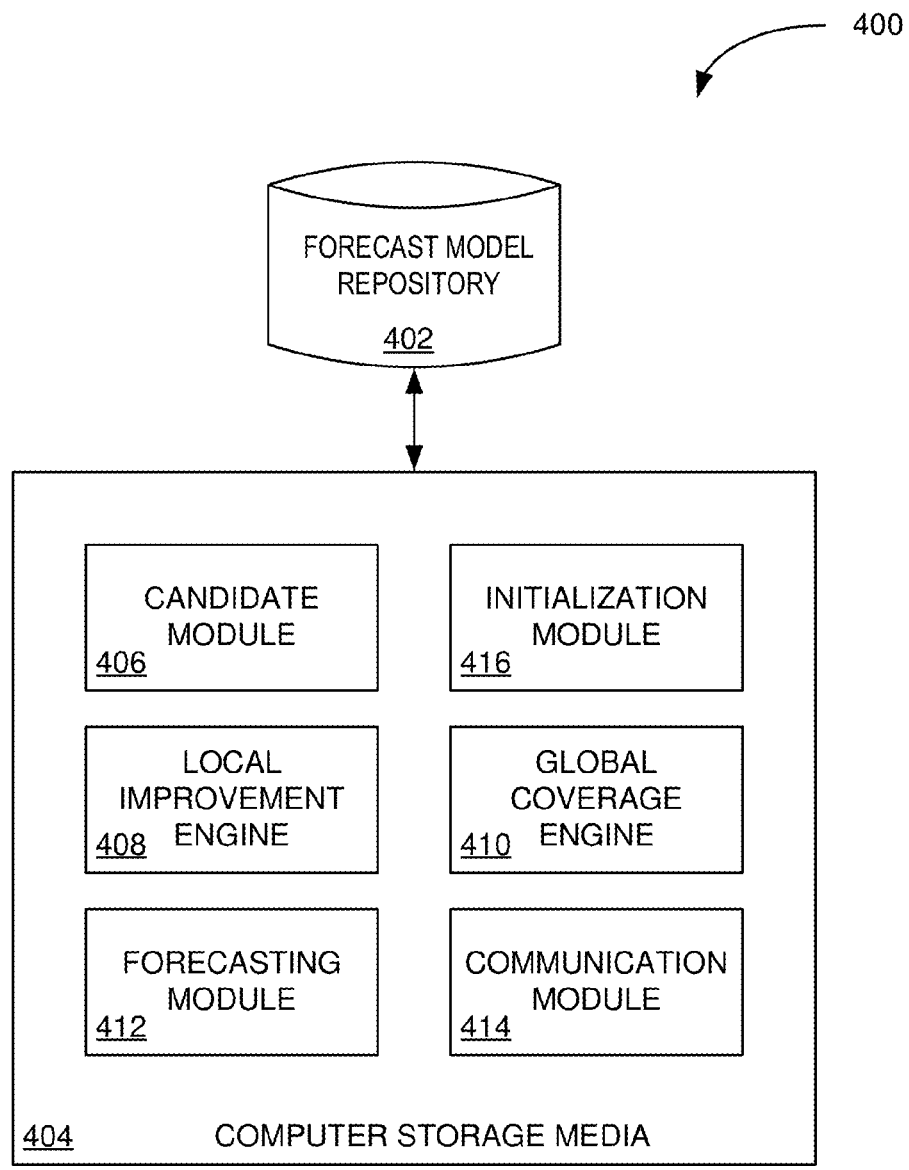
FIG. 4 illustrates an example energy forecasting system.

FIG. 4 illustrates an example energy forecasting system 400. Forecast model repository 402 stores forecast model instances. The respective forecast model instances specify an energy forecast model and values for a plurality of energy forecast model parameters for the energy forecast model. Computer-readable storage media 404 stores a plurality of computer-executable modules, that when executed by a computing device, cause the computing device to dynamically forecast energy. Candidate module 406 selects a plurality of forecast model instances from the forecast model repository as candidate instances for local improvement. In some examples, candidate module 406 selects the candidate instances based on an associated forecast error. For example, the ten forecast model instances with the lowest forecast errors can be selected. A local improvement engine 408 performs a local improvement process on the candidate instances. The local improvement process transforms at least some of the candidate instances into improved forecast model instances having lower forecast errors than the forecast errors of the plurality of the corresponding candidate forecast model instances. The improved forecast model instances have at least some alternative parameter values for the parameters of the corresponding candidate forecast model instances. In some examples, the local improvement process comprises applying a plurality of local optimization algorithms to the candidate instances substantially concurrently, with a forecasting module 412 generating updated energy forecasts as improved forecast model instances are determined through the local improvement process.

A global coverage engine 410 performs a global coverage process. The global coverage process evaluates whether forecast model instances having an energy forecast model different from the energy forecast models of the candidate instances have a lower forecast error than at least one of the forecast model instances stored in the repository. The global coverage process can also identify forecast model instances having energy forecast models the same as the models of the candidate instances but with different parameter values. When such instances are found, they can be added to forecast model repository 402, where the instances will be available for future selection as a candidate instance for local improvement. In some examples, global coverage engine 410 is omitted. Forecasting module 412 calculates energy forecasts and updated energy forecasts. The updated energy forecasts are calculated using an improved forecast model instance. A communication module 414 receives requests for energy forecasts and provides energy forecasts and updated energy forecasts. In some examples, system 400 includes an initialization module 416 that selects a forecast model instance having the lowest forecast error of the forecast model instances in repository 402 as an initial forecast model instance.

Figure 5:
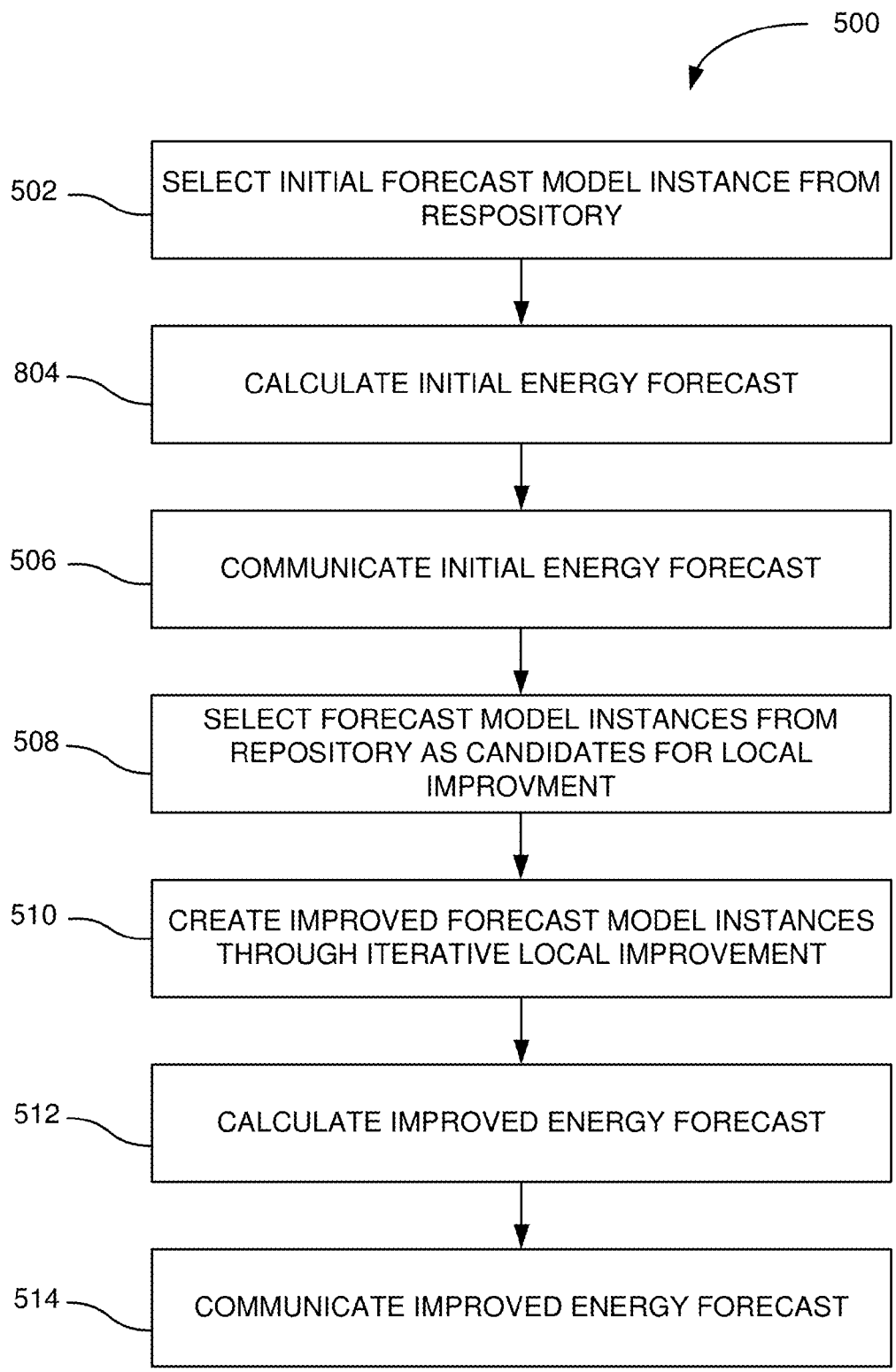
FIG. 5 illustrates an example method of dynamically forecasting energy in which a local improvement process is performed.

FIG. 5 illustrates a method 500 of dynamically forecasting energy. In process block 502, an initial forecast model instance is selected from a forecast model repository storing forecast model instances. The initial forecast model instance can be, for example, the instance in the forecast model repository with the lowest forecast error. In process block 504, an initial energy forecast is calculated using the initial forecast model instance. In process block 506, the initial energy forecast is communicated. A plurality of forecast model instances from the forecast model repository are selected as candidate forecast model instances for local improvement in process block 508. In process block 510, a plurality of improved forecast model instances are created based on the candidate forecast model instances through an iterative local improvement process comprises, for respective candidate forecast model instances, determining alternative values for at least some of the energy forecast model parameters of the candidate forecast model instance. The improved forecast model instances include the energy forecast model of the respective candidate forecast model instance and the alternative values for the energy forecast model parameters. Local improvement can be, for example, similar to the local improvement processes described with respect to FIGS. 1-4. In process block 512, at least one improved energy forecast is calculated using at least one of the improved forecast model instances. The at least one improved energy forecast is communicated in process block 514. In some examples, method 500 also comprises a global coverage process such as, for example, the global coverage processes described with respect to FIGS. 1-4.

Examples of Parallel and Flexible Local Optimization

The local improvement processes described herein with respect to FIGS. 1-5 are flexible, iterative optimization processes. In some examples, the parameters of the forecast model instances provided by the forecast model repository are estimated using different local optimization algorithms. With that, the aim is to increase the probability of finding improved forecast model instances. Due to starting the optimization from multiple starting points (i.e., forecast model instances) multiple areas of the search space can be covered and getting stuck in a single local optima can be avoided. Furthermore, using different optimization algorithms avoids a manual choice of a single algorithm that might not find an acceptable solution.

The optimization also allows applications to subscribe to the improvements found during the instance refinement. Applications can flexibly control their subscription to the optimization process by defining runtime constraints or accuracy targets. They can also terminate the subscription at any time. For this reason, the combinations of forecast model instances and optimization algorithms, referred to as optimization runs, can be executed in an order that reflects their potential to find improvements. The potential can be determined by ranking the optimization runs using their expected runtime and accuracy, where optimization runs that are expected to deliver the best improvements in the shortest runtime are favored. The handling of constraints and the ranking of optimization runs are described below in more detail.

Examples of Handling Application-Defined Constraints

With the option to define runtime constraints and accuracy targets, the fact that some applications might need a final result after a specific time while others target a certain accuracy independent of the runtime is acknowledged. Runtime limits provided by applications can be handled as hard constraints, meaning that the optimization is canceled with the best results found as soon as the runtime limit is reached. Thus, defining a runtime constraint can be especially useful when the receipt of a forecasting result is time critical, but the best possible accuracy is not required. In some examples, only optimization runs that are expected to finish in the given time limit are considered. As soon as the defined runtime is passed, the forecast is calculated using the best-forecast model instance found so far.

As it is typically not possible to guarantee a certain forecasting accuracy, applications may define an accuracy target rather than a constraint. An accuracy target is interpreted as a "premature" convergence criterion, meaning that the optimization is finished as soon as the defined accuracy is reached. This is especially useful for applications that can accept a certain forecast error for executing their tasks. As soon as the target accuracy is reached, the final forecast can be calculated. If the accuracy target cannot be reached, the optimization can finish after all optimization runs converged or the application terminates the subscription. Applications may also combine runtime constraints and accuracy targets.

Examples of Ranking of Optimization Runs

Figure 6:
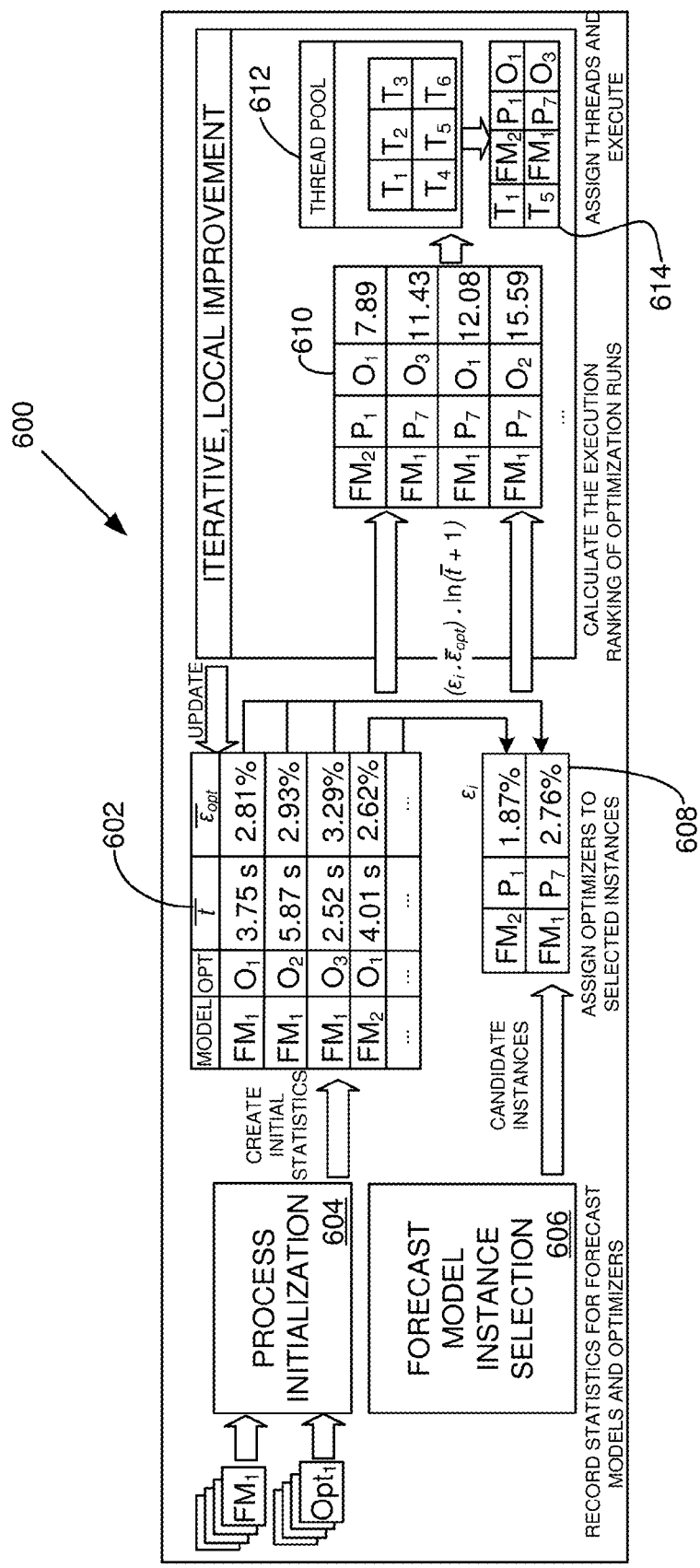
FIG. 6 is a flow chart illustrating an example of dynamic energy forecasting using a local improvement process.

To rapidly provide significant improvements, the most beneficial execution order of the optimization runs can be determined by ranking them based on their expected runtime and accuracy. The goal is to first execute optimization runs that are expected to deliver the highest improvements in the shortest runtime. To calculate the ranking, the accuracy of the candidate forecast model instance can be combined with the expected runtime and accuracy of the assigned optimization algorithm. An example ranking process 600 is illustrated in FIG. 6.

The basis for estimating the expected runtime and accuracy of the employed optimization algorithms are statistics 602 recorded during the initialization 604 of process 600. Since both runtime and accuracy of an optimizer highly depend on the forecast model and the starting point, individual statistics are recorded for each combination of available forecast models ($FM_i$) and local optimizers ($O_j$). During initialization 604, a heuristic forecasting calculation strategy considering all supported forecast models can be used. Additionally, initialization 604 can involve multiple starting points, which can all be used for calculating initial statistics 602. The expected accuracy of an optimizer in conjunction with one forecast model is the median of all resulting forecast errors $\epsilon^-_{opt}$ for the different starting points $P_p$. The median can be used instead of the average, due to its robustness against outliers. For estimating the expected runtime, the more pessimistic 3rd quartile of the recorded runtimes t can be used. Thus, a value closer to the worst case can be chosen while still ignoring single outliers. In the presence of runtime constraints, optimizers can be included in the optimization processes that are expected to finish in the given limits.

After a forecast model selection 606, such as candidate forecast model instance selection 308 in FIG. 3, the forecast model instance candidates that are subject for further refinement (i.e., local improvement) are received. Those instances can already be ordered by their accuracy (i.e., their forecast errors) as shown in block 608, which means that these measurements can be directly used as input for calculating a ranking. First, the statistics of the optimizers can be connected to the provided candidate instances. This assignment can also involve allocating the matching statistics with respect to the forecast model of the respective instance. Thus, for the later calculation of the ranking, the instances involving for example forecast model $FM_1$ (i.e., $FM_1 P_p$) can consider the statistics of all optimizers.

The execution order of the optimization runs can also be calculated. Three components—the measured accuracy $\epsilon_i$ of the candidate instances as well as the runtime $t^-$ and accuracy $\epsilon^-_{opt}$ of the optimization algorithms—can be combined to compute the ranks of the optimization runs. The rank reflects the expected evolution of the forecast error over the runtime of an optimization run. There are multiple options for calculating the ranking. A first option is to directly use the expected accuracy of the instances or the runtime of the optimization algorithms. However, optimization runs with the highest potential of finding the largest improvements in the shortest runtime are favored in some examples. Executing the runs only by their runtime would mean that all fast running optimization runs would be executed first, regardless of their expected potential for finding improvements. Likewise, when ordering the optimization runs by their accuracy, they would be executed without considering their runtime, potentially leading to long execution times. An alternative would be to assume a dependency between the forecasting accuracy and the runtime and use this dependency to determine a calculation rule. A linear dependency for example would result in a simple multiplication of the forecast error and the average runtime $\epsilon_i \cdot t$. However, a linear dependency equally weights runtime and accuracy, meaning that it is hard for very accurate algorithms to compensate for a potentially long runtime. This is less useful in providing a forecast with the best possible accuracy and not in the shortest possible runtime. Additionally, in experiments it was observed that the runtime t of an optimization run asymptotically scales as $t=O(\exp(C/\epsilon))$ with decreasing forecast error $\epsilon$, where C is a parameter characteristic for the algorithm at hand. Accordingly, it is assumed that $$t = A \exp(C/\epsilon) + f(\epsilon) \quad (1)$$

where A and C are parameters to be determined, and f is a correction to the leading exponential behavior that can be neglected in the limit $\epsilon \rightarrow 0$.

In an example experiment with the Nelder Mead algorithm optimizing the Triple Seasonal Exponential Smoothing model on the NationalGrid dataset, the expected linear behavior for small values of $\epsilon$ is observed. The parameters C and A are easily extracted from the slope and intercept of the straight line (red color) fitting ln t for $1/\epsilon \rightarrow \infty$. The experiment was repeated for other forecast models and optimization algorithms, resulting in similar results. Asymptotically, for small forecast errors, runtime and accuracy thus depend on both parameters A and C, which can be characterized by the forecast model and optimization algorithm of an optimization run. The slope C describes the pace an algorithm reduces the forecast error. The smaller the slope, the faster converges the optimization. The offset describes the minimal runtime to find a first result. For ranking, the pace of an algorithm is a relevant parameter. The minimal runtime changed only slightly across algorithms. Thus, omitting the constant offset, the rank of an optimization run can be computed as $$C \leftarrow \epsilon \cdot \ln(t). \quad (2)$$

The expected accuracy of an optimization run can be characterized by two forecast errors—the forecast error of the candidate instance $\epsilon_i$ and the expected forecast error of the optimization algorithm $\epsilon^-_{opt}$. Equation (2) only accounts for the latter. To include both errors, $\epsilon$ in Eq. (2) can be substituted by the product of both forecast errors $\epsilon_i \cdot \epsilon^-_{opt}$. Further, t can be replaced by t+1 to prevent negative values arising from the natural logarithm. As a result, the final ranking can take the form $$C = (\epsilon_i \cdot \epsilon^-_{opt}) \cdot \ln(t^- + 1). \quad (3)$$

Using Eq. (3) a rank can be calculated for the optimization runs, and the runs can be ordered accordingly, as shown in block 610. The lowest rank represents the optimization run expected to find the largest improvement in the shortest time.

For eventually executing the optimization runs, the optimization runs can be placed in a task queue in the order of the ranking. The system can then assign a number of threads, shown in block 612, that process the queue in parallel by picking the optimization run currently on the top of the queue, as shown in block 614. If a refined instance is an improvement over the current best instance, the system can calculate an improved forecast that is afterwards provided to the application. Similarly, when an application terminates the subscription, the system can immediately stop all optimization runs. The best instances found through the local improvement process can be collected from the optimization runs, and the last one can be used to calculate a refined forecast that is then delivered to the application as the final result. In addition to the forecasts, the currently achieved forecast error can be transmitted, which can be used to evaluate the quality of the forecast and to create confidence intervals around the prediction. After all optimization runs converge, the flexible local optimization is finished and the subscription can be terminated from the system side. In addition to the provisioning of the final forecast, the final most accurate forecast model instance can be added to the forecast model repository. In some examples, a global coverage process can then be performed.

Examples of Forecast Model Repositories

Example online forecasting processes can use a case-based reasoning approach to identify a (or the most) suitable forecast model instances for the subsequent optimization. Case-based reasoning means to solve new problems under consideration of solutions for previously encountered similar problems. This is similar to the human reasoning behavior, meaning to learn from previous events and to apply obtained experiences to the solution of new problems. In the context of the online forecasting processes, previously used forecast model instances can be preserved in a forecast model repository (such as shown in FIG. 4) that is the case-base. The instances that best match the current problem, i.e., the current development of the time series and refine the solution by re-estimating the candidate instances, can then be retrieved.

There are multiple options for how to implement a forecast model repository that can work with the online forecasting processes. Examples are a schema of relational tables or custom implementation-specific containers. In some examples, implementations of a repository comply with several requirements. First, assess and order forecast model instances: the repository is able to assess and order the forecast model instances by their applicability for the most recent developments of the time series. Thus, the forecast model repository provides metrics for evaluating the models. Also, it should allow the external definition of further evaluation metrics. Second, the repository is agnostic against models and optimization algorithms: the repository can work with all kinds of forecast models and optimizers as long as they comply with a defined interface. Third, the repository is tightly integrated into the forecasting system: the repository can be tightly integrated into the forecasting system, rather than an external component. With that, an efficient communication between all components is allowed for. Fourth, the repository provides results efficiently: the first intermediate forecast can be provided as quickly as possible. Thus, the model instance selection process should work very efficiently. Fifth, support time budgets: the selection process can support the definition of time constraints and can be interruptible at any time. When interrupted, the selection process provides the currently best-found forecast model instances. Sixth, the repository works without human intervention: besides basic configurations during setup, no human interaction with the forecast model repository should be necessary during runtime.

In some examples, a forecast model repository in which the forecast model instances are selected from the repository using the time series context as a decision criterion is used. The term "time series context" refers to background processes and influences that affect the development of a time series; examples are meteorological (e.g., temperature), calendar (e.g., date, weekday) and economic (e.g., sport events) influences. Changes in the time series context can lead to changing optimal forecast model parameters. Similar contexts can lead to similar parameters of the forecasting models. Thus, forecast model repositories can be searched for instances that previously produced accurate forecasts in a context similar to the current one. Afterwards the accuracy of the identified candidate instances is evaluated, which can be more convenient than to compare the accuracy of all stored instances. Multiple forecast models in the repository can be supported instead of storing only the parameters of a single model. This helps to avoid missing better solutions provided by further accurate forecast models.

Regarding the technical implementation, in some examples, the forecast model repository is tightly integrated into the EDM system. The forecast model instances can be persisted in a special database schema that can be designed specifically for the forecast model repository. There, forecast model instances can be stored using their forecast model, parameter combination, the start point and duration of the model's validity, as well as the accuracy they achieved during their last consideration. The forecast model repository can be implemented as a balanced tree for fast searching and inclusion of further instances. The forecast model instances are the leaves in this tree, while the time series context attributes (e.g., time of day, temperature) serve as decision nodes. During identifying the most suitable instances, the repository tree can be traversed using the attributes of the current time series context. Afterwards, accuracy of candidates can be assessed to identify an acceptable (e.g., the most accurate) instance for calculating the first forecast. Candidates can be provided to the optimization ordered by their accuracy. The accuracy values can serve as input for the ranking of the optimization runs.

Examples of Global Coverage Processes

With global coverage, the risk of missing better solutions in areas of the search space not covered by the local algorithms can be reduced. Additionally, forecast models that are supported by the EDM system, but are currently not included in the forecast model repository, can be supported. During the global coverage process, multiple standard global search algorithms, such as simulated annealing or genetic algorithms, can be executed with the goal of finding additional promising forecast model instances. Promising instances in this sense can mean instances that exhibit a better accuracy than the worst instance currently included in the forecast model repository. The global coverage process can assign each global optimization algorithm randomly to one forecast model. Due to the random assignment, over time the complete search space of forecast models and global optimization algorithms is eventually covered. Typically, providing starting points is not necessary, as global optimization algorithms consider the entire search space. Promising instances found can be directly added to the forecast model repository without being part of a further optimization. They can be part of future regular executions of the online forecasting process. Thus, the global coverage process can serve as a regular maintenance for the forecast model repository and can be executed asynchronously to forecasting requests as some kind of a background process. As such, it can run only when free system resources are available, which means that the global coverage can be paused at any time and resumed during lower load situations.

Examples of Initialization

In some examples, before an online forecasting process is started on a new time series, an initial set of forecast model instances is created for the forecast model repository. For example, a heuristic forecasting strategy can be executed on the first two third of the time series. In contrast to a conventional heuristic strategy, the forecast models may not be identified beforehand. Instead, all forecast models available in the system may be considered. This can be helpful for recording the statistics necessary for the later ranking of the optimization runs. During the execution of the heuristic strategy, the forecast models can be optimized first using global optimization algorithms and afterwards using local optimization algorithms. After creating the initial model instances, the remainder of the time series can be added value-by-value, and the online forecasting process can be simulated in random intervals (e.g., at least once per day). The simulation can ensure a large variety of model instances contained in the repository and that the most recent time series values are also considered.

A separate forecast model repository can be used for each time series, and an initialization can be conducted each time a new time series is added. Such an initialization is typically used by any application calculating forecasts. In most cases, the initialization follows the heuristic forecasting strategy. However, due to the additional process simulation, in most cases the initialization will need more time. However, the significantly reduced query response times during runtime compensate for the small disadvantage of a longer initialization. In addition, during the initialization of an EDM system still provides forecasting results using either the heuristic approach or forecast model instances from the partially filled repository.

The iterative approaches described herein can optimize the overall forecasting process allowing to rapidly provide forecast results at any time. Also, the approaches are applicable for more complex models than simple regression models.

The online forecasting described herein provides a very efficient and flexible way for calculating accurate forecasts specifically suited for the requirements of the new energy market developments. Flexible iterative forecast model optimization can provide a first intermediate forecast after around one millisecond that in most cases is already very accurate. Thus, applications using an EDM system with the described dynamic online energy forecasting processes can almost instantly receive a forecast to start their further processing. With those short reaction times, applications are enabled to work in the new real-time environment posed by the current energy market developments.

In addition, the described processes iteratively provide further improvements. In contrast to other forecasting calculation strategies, the optimization of the online forecasting process can involve multiple forecast models in parallel. With that, the probability of finding the most accurate forecast model instance is substantially increased, because getting stuck in a local optimum with respect to forecast models and parameter combinations is avoided. Applications can use the improvements to adapt their measures and to ensure that an accurate forecast was provided to the application. With the iterative provisioning of results and the option for applications to influence the progression of the forecasting process, applications requiring forecasts after a short amount of time and applications that need the best possible accuracy are equally supported.

The probability of finding improvements is substantially increased by considering multiple forecast models and parameter combinations in parallel. At the same time, the efficiency of the parameter estimation is improved by implementing an intelligent execution in parallel.

The online forecasting described herein can be used, for example, in: in-memory, column-oriented, relational database management systems for integrated time series forecasting and analytics; in analytics and online analytics processing, for example as an EDM system with an online forecasting process; in smart meter analytics; and in other systems dealing with time series analysis and forecasting.

Examples of Implementation Environments

Figure 7:
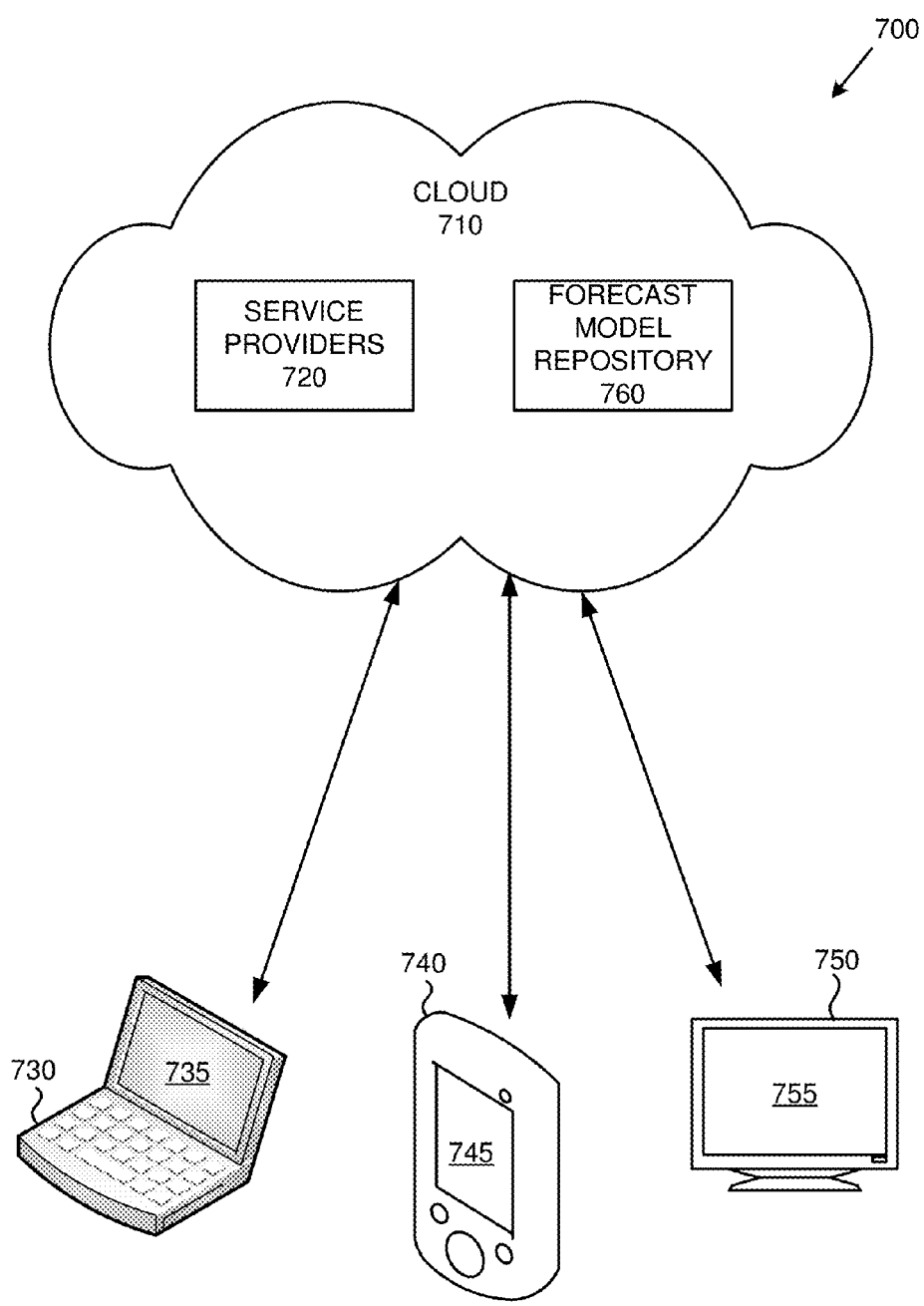
FIG. 7 is a diagram illustrating a generalized implementation environment in which some described examples can be implemented.

FIG. 7 illustrates a generalized example of a suitable implementation environment 600 in which described embodiments, techniques, and technologies may be implemented.

In example environment 700, various types of services (e.g., computing services) are provided by a cloud 710. For example, the cloud 710 can comprise a collection of computing devices, which may be located centrally or distributed, that provide cloud-based services to various types of users and devices connected via a network such as the Internet. The implementation environment 700 can be used in different ways to accomplish computing tasks. For example, some tasks (e.g., processing user input and presenting a user interface) can be performed on local computing devices (e.g., connected devices 730, 740, 750) while other tasks (e.g., storage of data to be used in subsequent processing) can be performed in the cloud 710.

In example environment 700, the cloud 710 provides services for connected devices 730, 740, 750 with a variety of screen capabilities. Connected device 730 represents a device with a computer screen 735 (e.g., a mid-size screen). For example, connected device 730 could be a personal computer such as desktop computer, laptop, notebook, netbook, or the like. Connected device 740 represents a device with a mobile device screen 745 (e.g., a small size screen). For example, connected device 740 could be a mobile phone, smart phone, personal digital assistant, tablet computer, or the like. Connected device 750 represents a device with a large screen 755. For example, connected device 750 could be a television screen (e.g., a smart television) or another device connected to a television (e.g., a set-top box or gaming console) or the like. One or more of the connected devices 730, 740, 750 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 700. For example, the cloud 710 can provide services for one or more computers (e.g., server computers) without displays.

Services can be provided by the cloud 710 through service providers 720, or through other providers of online services (not depicted). For example, cloud services can be customized to the screen size, display capability, and/or touchscreen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users). Cloud 710 can store a forecast model repository 760 in accordance with the technology described herein.

Examples of Computing Environments

Figure 8:
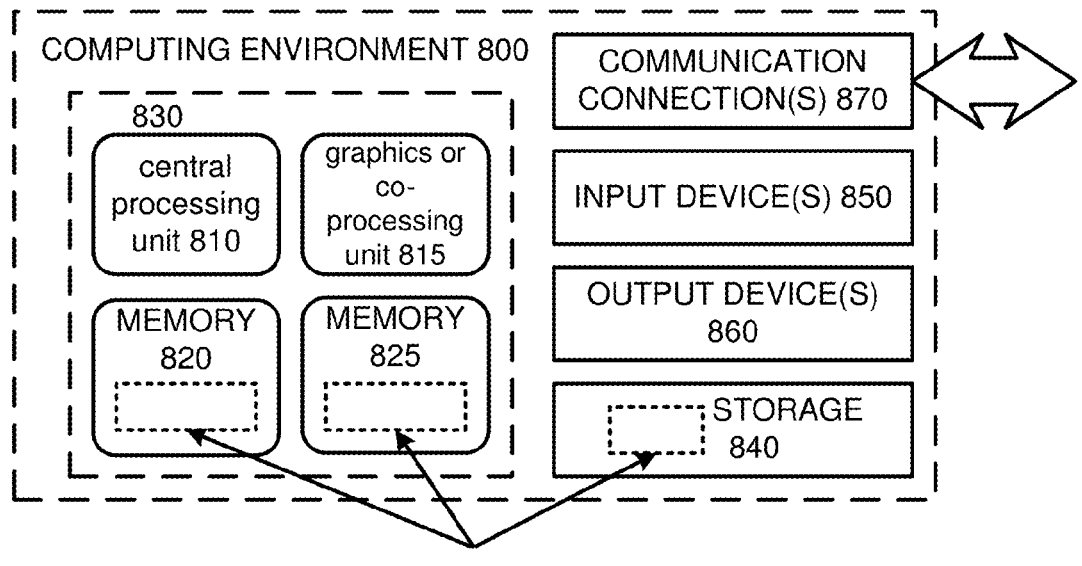
FIG. 8 is a diagram illustrating a generalized example of a suitable computing environment with which some described examples can be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, media player, gaming system, mobile device, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 715. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820 and 825 and software 880 can store computer-executable instructions for online forecasting as described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. For video encoding, the input device(s) 850 may be a camera, video card, TV tuner card, or similar device that accepts video input in analog or digital form, or a CD-ROM or CD-RW that reads video samples into the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. One or more computer-readable storage media storing computer-executable instructions that, when executed, cause a computing system to perform a method of dynamically forecasting energy, the method comprising:
    receiving an energy forecast request for an electricity grid;
    in response to receiving the energy forecast request, calculating an initial energy forecast for the electricity grid;
    calculating, for the electricity grid, at least one improved energy forecast having a greater accuracy than the initial energy forecast by:
        selecting one or more of a plurality of forecast model instances as candidate forecast model instances, the respective forecast model instances specifying an energy forecast model and values for a plurality of energy forecast model parameters for the energy forecast model;
        transforming at least one of the candidate forecast model instances into an improved forecast model instance having greater accuracy than the candidate forecast model instance by determining alternative values for at least some of the plurality of energy forecast model parameters of the candidate forecast model instance; and
        forecasting energy for the electricity grid using the improved forecast model instance; and
    adjusting energy production in the electricity grid based on the at least one improved energy forecast.

2. The one or more computer-readable storage media of claim 1, wherein a plurality of the candidate forecast model instances are transformed into improved forecast model instances.

3. The one or more computer-readable storage media of claim 2, wherein the method further comprises:
    upon forecasting energy for the electricity grid using one of the plurality of improved forecast model instances, communicating a resulting energy forecast.

4. The one or more computer-readable storage media of claim 1, wherein the initial energy forecast for the electricity grid is calculated using one of a plurality of forecast model instances stored in a forecast model instance repository, and wherein at least some of the plurality of forecast model instances stored in the repository were previously used to calculate an energy forecast.

5. The one or more computer-readable storage media of claim 4, wherein the method further comprises upon determining that the improved forecast model instance is not already stored in the repository, adding the improved forecast model instance to the repository.

6. The one or more computer-readable storage media of claim 1, wherein a local improvement process comprises the transforming, and wherein the method further comprises:
    performing a global coverage process, wherein the global coverage process determines whether forecast model instances not evaluated in the local improvement process have a greater accuracy than at least one forecast model instance stored in a forecast model repository from which the candidate forecast models are selected.

7. The one or more computer-readable storage media of claim 6, wherein the global coverage process is performed after the local improvement process.

8. The one or more computer-readable storage media of claim 1, wherein the calculating at least one improved energy forecast having a greater accuracy than the initial energy forecast further comprises:
    applying a plurality of local optimization algorithms to the candidate forecast model instances, wherein at least one of the plurality of local optimization algorithms is used to transform the at least one of the candidate forecast model instances into the improved forecast model instance.

9. The one or more computer-readable storage media of claim 1, wherein the method further comprises upon determining that a forecast error threshold has been reached, ending the method.

10. A computer-implemented method of dynamically forecasting energy for an electricity grid, the method comprising:
    in an energy data management system implemented on one or more computing devices having one or more processors:
        selecting an initial forecast model instance from a forecast model repository storing forecast model instances, the respective forecast model instances specifying an energy forecast model and values for a plurality of energy forecast model parameters for the energy forecast model;
        calculating an initial energy forecast for the electricity grid using the initial forecast model instance;
        communicating the initial energy forecast;
        selecting a plurality of forecast model instances from the forecast model repository as candidate forecast model instances for local improvement;

creating a plurality of improved forecast model instances based on the candidate forecast model instances through an iterative local improvement process,
   wherein the local improvement process comprises, for respective candidate forecast model instances, determining alternative values for at least some of the energy forecast model parameters of the candidate forecast model instance, and
   wherein the improved forecast model instances include the energy forecast model of the respective candidate forecast model instance and the alternative values for the energy forecast model parameters;
calculating at least one improved energy forecast for the electricity grid using at least one of the improved forecast model instances, the at least one improved energy forecast having a greater accuracy than the initial energy forecast; and
balancing energy production in the electricity grid with demand corresponding to the at least one improved energy forecast.

11. The method of claim 10, further comprising:
performing a global coverage process, wherein the global coverage process determines whether forecast model instances not evaluated in the local improvement process result in calculated energy forecasts having a greater accuracy than the least accurate forecast model instance stored in the forecast repository.

12. The method of claim 11, wherein the global coverage process comprises, for a plurality of possible energy forecast models and a plurality of possible parameter values for parameters of the respective possible energy forecast models, iteratively:
applying one or more global optimization algorithms to identify a forecast model instance having a lower forecast error than the forecast model instance in the repository with the highest forecast error, the forecast model instance comprising one of the plurality of possible energy forecast models and values for the corresponding parameters; and
upon determining that the forecast model instance is not already stored in the forecast model repository, adding the forecast model instance to the repository.

13. The method of claim 10, wherein the alternative values for the energy forecast model parameters are determined by applying a plurality of local optimization algorithms to the candidate forecast model instances.

14. The method of claim 13, wherein the plurality of local optimization algorithms are applied concurrently to the respective candidate forecast model instances.

15. An energy forecasting system, comprising:
one or more computing devices, the respective computing devices having at least one processor;
a forecast model repository storing forecast model instances, the respective forecast model instances specifying an energy forecast model and values for a plurality of energy forecast model parameters for the energy forecast model; and
one or more computer-readable storage media storing computer-executable modules that, when executed by at least one of the one or more computing device, cause the computing device to dynamically forecast energy for an electricity grid, the modules comprising:
   a candidate module configured to select a plurality of forecast model instances from the forecast model repository as candidate instances for local improvement;
   a local improvement engine configured to perform a local improvement process on the candidate instances, the local improvement process transforming at least some of the candidate instances into improved forecast model instances having lower forecast errors than the forecast errors of the plurality of the corresponding candidate forecast model instances, the improved forecast model instances having at least some alternative parameter values for the parameters of the corresponding candidate forecast model instances;
   a global coverage engine that configured to perform a global coverage process, the global coverage process evaluating whether forecast model instances having an energy forecast model different from the energy forecast models of the candidate instances have a lower forecast error than at least one of the forecast model instances stored in the repository;
   a forecasting module configured to calculate energy forecasts and updated energy forecasts for the electricity grid, the updated energy forecasts calculated using an improved forecast model instance; and
   a communication module configured to receive requests for energy forecasts for the electricity grid and provide calculated energy forecasts and updated energy forecasts for the electricity grid, wherein the one or more computing devices are configured to adjust energy production in the electricity grid by at least one of: changing energy flow directions or providing start-up notifications to power plants.

16. The system of claim 15, wherein the modules further comprise an initialization module configured to select a forecast model instance having the lowest forecast error of the forecast model instances in the repository as an initial forecast model instance.

17. The system of claim 15, wherein the candidate module is further configured to select the candidate instances based on an associated forecast error.

18. The system of claim 15, wherein the local improvement process comprises applying a plurality of local optimization algorithms to the candidate instances substantially concurrently, and wherein the forecasting module is further configured to generate updated energy forecasts as improved forecast model instances are determined through the local improvement process.

19. The system of claim 18, wherein the local improvement engine is further configured to continue the local improvement process iteratively until an instruction to end the process is received or a time-out has occurred.

20. The system of claim 15, wherein the global coverage engine is further configured to perform the global coverage process upon completion of the local improvement process.

* * * * *